(12) United States Patent
Saulsbury

(10) Patent No.: US 7,013,321 B2
(45) Date of Patent: Mar. 14, 2006

(54) METHODS AND APPARATUS FOR PERFORMING PARALLEL INTEGER MULTIPLY ACCUMULATE OPERATIONS

(75) Inventor: Ashley Saulsbury, Los Altos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 752 days.

(21) Appl. No.: 09/991,628

(22) Filed: Nov. 21, 2001

(65) Prior Publication Data

US 2003/0097391 A1 May 22, 2003

(51) Int. Cl.
*G06F 7/38* (2006.01)

(52) U.S. Cl. .................... 708/523; 708/524; 708/551; 708/552

(58) Field of Classification Search ............... 708/490, 708/501, 523, 603
See application file for complete search history.

(56) References Cited

U.S. PATENT DOCUMENTS

| | | | | |
|---|---|---|---|---|
| 4,945,507 A | * | 7/1990 | Ishida et al. ............... | 708/530 |
| 5,422,805 A | * | 6/1995 | McIntyre et al. ........... | 708/625 |
| 5,752,001 A | * | 5/1998 | Dulong ....................... | 703/2 |
| 6,272,512 B1 | * | 8/2001 | Golliver et al. ............ | 708/622 |
| 6,697,832 B1 | * | 2/2004 | Kelley et al. .............. | 708/501 |

FOREIGN PATENT DOCUMENTS

| | | |
|---|---|---|
| EP | 0 540 155 A2 | 5/1993 |
| WO | WO 01/67235 A2 | 9/2001 |
| WO | WO 01/67238 A1 | 9/2001 |

OTHER PUBLICATIONS

Ruby B. Lee, Hewlett–Packard, *Subword Parallelism with MAX–2*, (Aug. 1996) IEEE.

Sun Microelectronics, *VIS™ Instruction Set User's Manual*, Sun Microsystems, Inc., Part No.: 805–1394–01, (Jul. 1997), pp. 1–136.

Microelectronics, Hardward & Networking, *UltraSPARC™ The Visual Instruction Set (VIS™): On Chip Support for New–Media Processing*, Sun Microsystems, White Paper, downloaded from the Internet: http://www.sun.com/microelectronics/whitepapers/ wp95–022, on Jun. 4, 1999.

*VIS™ Instruction Set User's Manual*, Sun Microsystem, Inc., (Mar. 2000), pp. 25–74.

* cited by examiner

*Primary Examiner*—Chuong D. Ngo
(74) *Attorney, Agent, or Firm*—Townsend and Townsend and Crew LLP

(57) ABSTRACT

According to the invention, a processing core that executes a parallel multiply accumulate operation is disclosed. Included in the processing core are a first, second and third input operand registers; a number of functional blocks; and, an output operand register. The first, second and third input operand registers respectively include a number of first input operands, a number of second input operands and a number of third input operands. Each of the number of functional blocks performs a multiply accumulate operation. The output operand register includes a number of output operands. Each of the number of output operands is related to one of the number of first input operands, one of the number of second input operands and one of the number of third input operands.

20 Claims, 8 Drawing Sheets

METHODS AND APPARATUS FOR PERFORMING PARALLEL INTEGER MULTIPLY ACCUMULATE OPERATIONS

CROSS-REFERENCE TO RELATED APPLICATIONS

This application is related to U.S. patent application Ser. No. 09/992,064 dated Nov. 21, 2001, entitled "Methods and Apparatus for Performing Pixel Average Operations", which is incorporated herein by reference.

BACKGROUND OF THE INVENTION

The present invention relates generally to an improved computer processing instruction set, and more particularly to an instruction set having a multiply-accumulate functionality.

Computer architecture designers are constantly trying to increase the speed and efficiency of computer processors. For example, computer architecture designers have attempted to increase processing speeds by increasing clock speeds and attempting latency hiding techniques, such as data prefetching and cache memories. In addition, other techniques, such as instruction-level parallelism using VLIW, multiple-issue superscalar, speculative execution, scoreboarding, and pipelining are used to further enhance performance and increase the number of instructions issued per clock cycle (IPC).

Architectures that attain their performance through instruction-level parallelism seem to be the growing trend in the computer architecture field. Examples of architectures utilizing instruction-level parallelism include single instruction multiple data (SIMD) architecture, multiple instruction multiple data (MIMD) architecture, vector or array processing, and very long instruction word (VLIW) techniques. Of these, VLIW appears to be the most suitable for general purpose computing. However, there is a need to further improve architectures to increase efficiency.

Some instruction sets in recent microprocessor designs include a multiply-accumulate instruction. Combining the multiply functionality with an accumulate or sum function provides efficiencies because two operations are combined into one. Multiply-accumulate instructions allow performing video manipulations such as fades and alpha-blends more efficiently. However, more efficient multiply-accumulate functions are needed to more efficiently process video.

With certain arithmetic operations, the result can be too large to fit in the output register. For example, multiplication of two sixteen bit values potentially produces a thirty-two bit result. Attempting to put the result in a sixteen bit output register would cause an overrun. Although, the lower sixteen bits of a result could be put into the output register and it would appear to be a smaller result without the benefit of the high-order bits. Accordingly, improved methods are needed to represent overrun situations.

BRIEF DESCRIPTION OF THE DRAWINGS

The present invention is hereinafter described in conjunction with the appended drawing figure(s).

DESCRIPTION OF THE SPECIFIC EMBODIMENTS

Introduction

The present invention provides a novel computer processor chip having an sub-instruction for performing multiply-accumulate functions in parallel. As one skilled in the art will appreciate, performing multiple multiply-accumulate functions in a single instruction issue increases efficiency. Additionally, allowing saturation of the result from the multiply-accumulate function is useful for image manipulation.

In the Figures, similar components and/or features have the same reference label. Further, various components of the same type are distinguished by following the reference label by a dash and a second label that distinguishes among the similar components. If only the first reference label is used in the specification, the description is applicable to any one of the similar components having the second label.

Processor Overview

Figure 1:
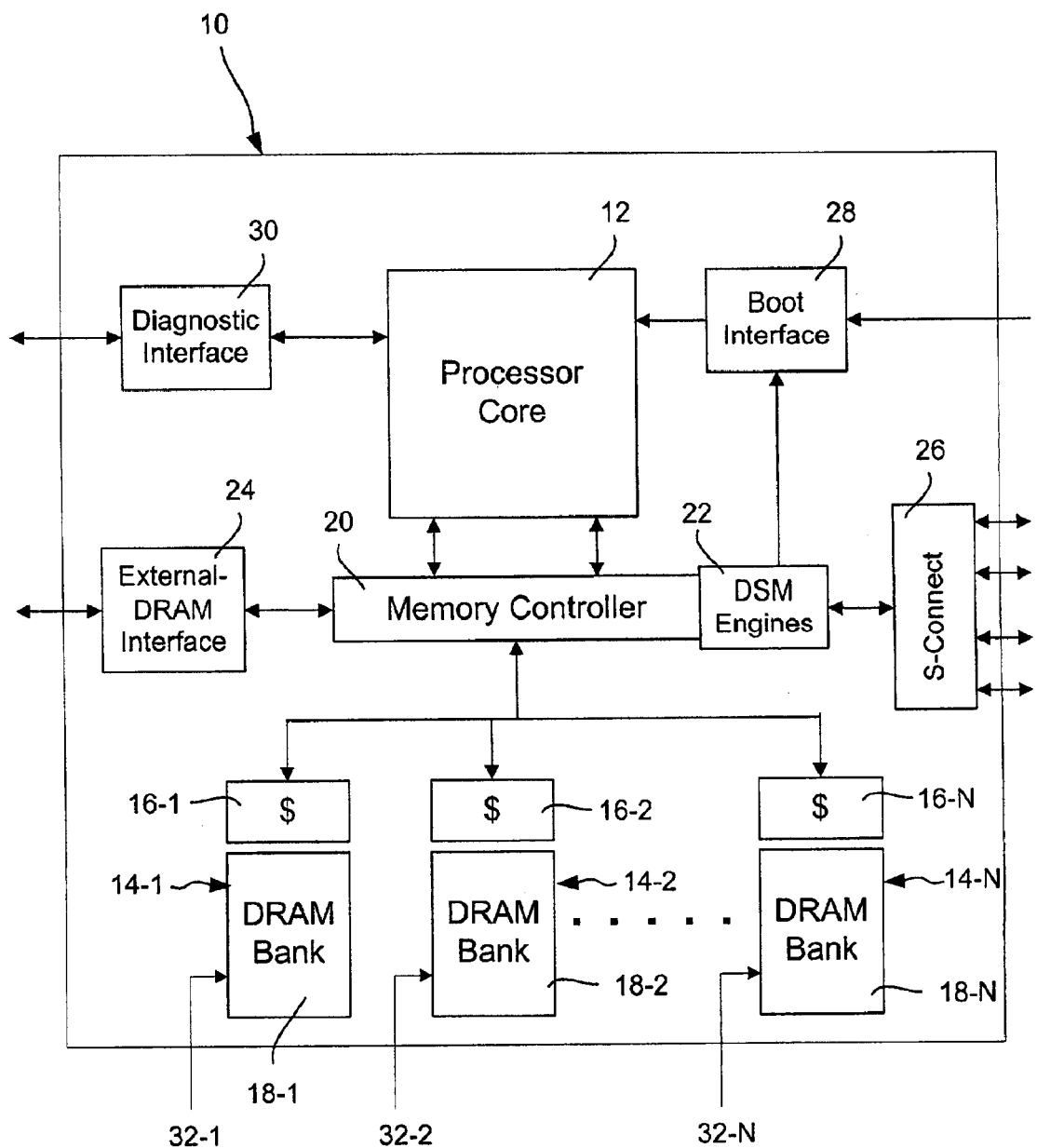
FIG. 1 is a block diagram of an embodiment of a processor chip having the processor logic and memory on the same integrated circuit.

With reference to FIG. 1, a processor chip 10 is shown which embodies the present invention. In particular, processor chip 10 comprises a processing core 12, a plurality of memory banks 14, a memory controller 20, a distributed shared memory controller 22, an external memory interface 24, a high-speed I/O link 26, a boot interface 28, and a diagnostic interface 30.

As discussed in more detail below, processing core 12 comprises a scalable VLIW processing core, which may be configured as a single processing pipeline or as multiple processing pipelines. The number of processing pipelines typically is a function of the processing power needed for the particular application. For example, a processor for a personal workstation typically will require fewer pipelines than are required in a supercomputing system.

In addition to processing core 12, processor chip 10 comprises one or more banks of memory 14. As illustrated in FIG. 1, any number of banks of memory can be placed on processor chip 10. As one skilled in the art will appreciate, the amount of memory 14 configured on chip 10 is limited by current silicon processing technology. As transistor and line geometries decrease, the total amount of memory that can be placed on a processor chip 10 will increase.

Connected between processing core 12 and memory 14 is a memory controller 20. Memory controller 20 communicates with processing core 12 and memory 14, and handles the memory I/O requests to memory 14 from processing core 12 and from other processors and I/O devices. Connected to memory controller 20 is a distributed shared memory (DSM) controller 22, which controls and routes I/O requests and data messages from processing core 12 to off-chip devices, such as other processor chips and/or I/O peripheral devices. In addition, as discussed in more detail below, DSM controller 22 is configured to receive I/O requests and data messages from off-chip devices, and route the requests and messages to memory controller 20 for access to memory 14 or processing core 12.

High-speed I/O link 26 is connected to the DSM controller 22. In accordance with this aspect of the present invention, DSM controller 22 communicates with other processor chips and I/O peripheral devices across the I/O link 26. For example, DSM controller 22 sends I/O requests and data messages to other devices via I/O link 26. Similarly, DSM controller 22 receives I/O requests from other devices via the link.

Processor chip 10 further comprises an external memory interface 24. External memory interface 24 is connected to memory controller 20 and is configured to communicate memory I/O requests from memory controller 20 to external memory. Finally, as mentioned briefly above, processor chip 10 further comprises a boot interface 28 and a diagnostic interface 30. Boot interface 28 is connected to processing core 12 and is configured to receive a bootstrap program for cold booting processing core 12 when needed. Similarly, diagnostic interface 30 also is connected to processing core 12 and configured to provide external access to the processing core for diagnostic purposes.

Processing Core

1. General Configuration

As mentioned briefly above, processing core 12 comprises a scalable VLIW processing core, which may be configured as a single processing pipeline or as multiple processing pipelines. A single processing pipeline can function as a single pipeline processing one instruction at a time, or as a single VLIW pipeline processing multiple sub-instructions in a single VLIW instruction word. Similarly, a multi-pipeline processing core can function as multiple autonomous processing cores. This enables an operating system to dynamically choose between a synchronized VLIW operation or a parallel multi-threaded paradigm. In multi-threaded mode, the VLIW processor manages a number of strands executed in parallel.

In accordance with one embodiment of the present invention, when processing core 12 is operating in the synchronized VLIW operation mode, an application program compiler typically creates a VLIW instruction word comprising a plurality of sub-instructions appended together, which are then processed in parallel by processing core 12. The number of sub-instructions in the VLIW instruction word matches the total number of available processing paths in the processing core pipeline. Thus, each processing path processes VLIW sub-instructions so that all the sub-instructions are processed in parallel. In accordance with this particular aspect of the present invention, the sub-instructions in a VLIW instruction word issue together in this embodiment. Thus, if one of the processing paths is stalled, all the sub-instructions will stall until all of the processing paths clear. Then, all the sub-instructions in the VLIW instruction word will issue at the same time. As one skilled in the art will appreciate, even though the sub-instructions issue simultaneously, the processing of each sub-instruction may complete at different times or clock cycles, because different sub-instruction types may have different processing latencies.

In accordance with an alternative embodiment of the present invention, when the multi-pipelined processing core is operating in the parallel multi-threaded mode, the program sub-instructions are not necessarily tied together in a VLIW instruction word. Thus, as instructions are retrieved from an instruction cache, the operating system determines which pipeline is to process each sub-instruction for a strand. Thus, with this particular configuration, each pipeline can act as an independent processor, processing a strand independent of strands in the other pipelines. In addition, in accordance with one embodiment of the present invention, by using the multi-threaded mode, the same program sub-instructions can be processed simultaneously by two separate pipelines using two separate blocks of data, thus achieving a fault tolerant processing core. The remainder of the discussion herein will be directed to a synchronized VLIW operation mode. However, the present invention is not limited to this particular configuration.

2. Very Long Instruction Word (VLIW)

Figure 2:
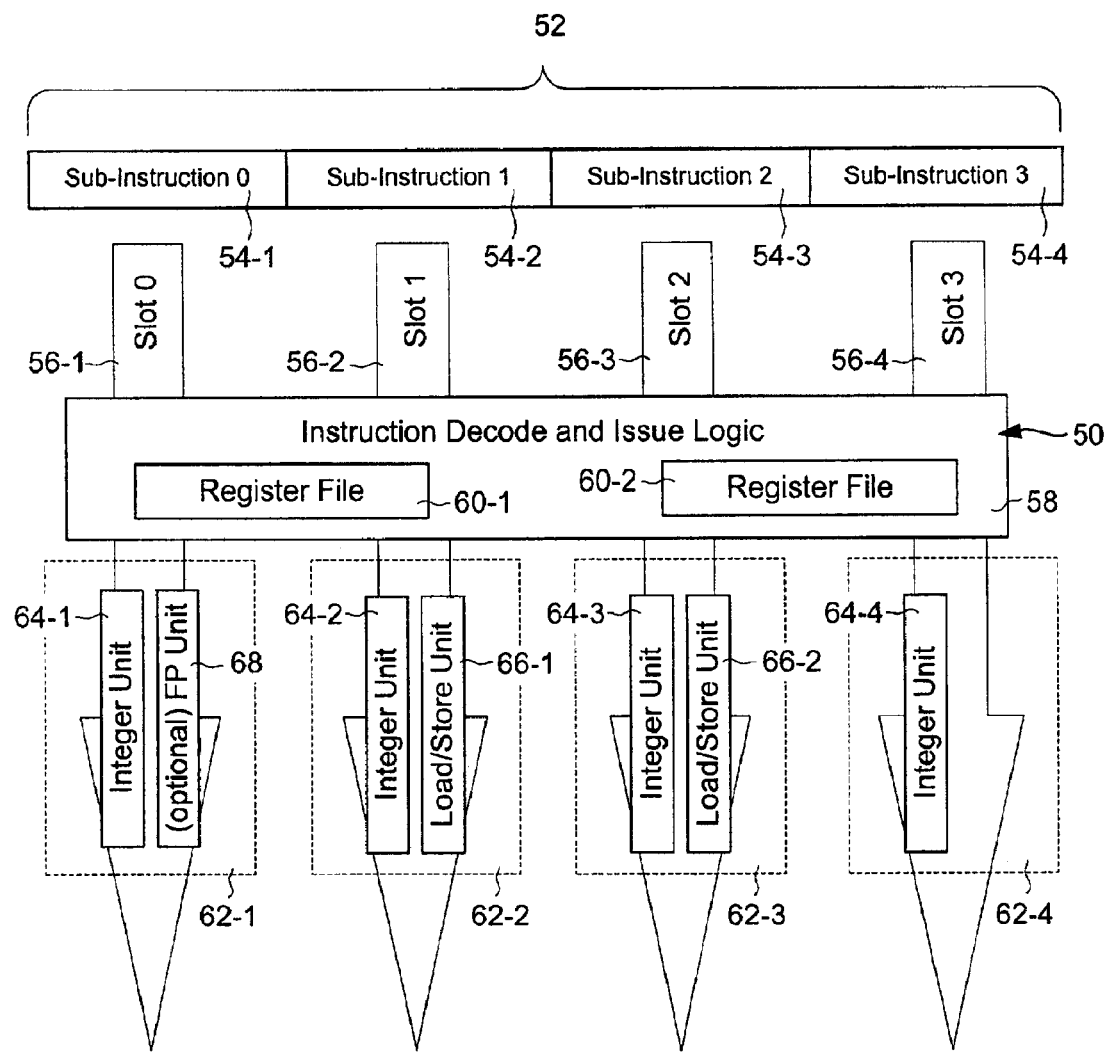
FIG. 2 is block diagram illustrating one embodiment of a processing core having a four-way VLIW pipeline design.

Referring now to FIG. 2, a simple block diagram of a VLIW processing core pipeline 50 having four processing paths, 56-1 to 56-4, is shown. In accordance with the illustrated embodiment, a VLIW 52 comprises four RISC-like sub-instructions, 54-1, 54-2, 54-3, and 54-4, appended together into a single instruction word. For example, an instruction word of one hundred and twenty-eight bits is divided into four thirty-two bit sub-instructions. The number of VLIW sub-instructions 54 correspond to the number of processing paths 56 in processing core pipeline 50. Accordingly, while the illustrated embodiment shows four sub-instructions 54 and four processing paths 56, one skilled in the art will appreciate that the pipeline 50 may comprise any number of sub-instructions 54 and processing paths 56. Typically, however, the number of sub-instructions 54 and processing paths 56 is a power of two.

Each sub-instruction 54 in this embodiment corresponds directly with a specific processing path 56 within the pipeline 50. Each of the sub-instructions 54 are of similar format and operate on one or more related register files 60. For example, processing core pipeline 50 may be configured so that all four sub-instructions 54 access the same register file, or processing core pipeline 50 may be configured to have multiple register files 60. In accordance with the illustrated embodiment of the present invention, sub-instructions 54-1 and 54-2 access register file 60-1, and sub-instructions 54-3 and 54-4 access register file 60-2. As those skilled in the art can appreciate, such a configuration can help improve performance of the processing core.

As illustrated in FIG. 2, an instruction decode and issue logic stage 58 of the processing core pipeline 50 receives VLIW instruction word 52 and decodes and issues the sub-instructions 54 to the appropriate processing paths 56. Each sub-instruction 54 then passes to the execute stage of pipeline 50 which includes a functional or execute unit 62 for each processing path 56. Each functional or execute unit 62 may comprise an integer processing unit 64, a load/store processing unit 66, a floating point processing unit 68, or a combination of any or all of the above. For example, in accordance with the particular embodiment illustrated in FIG. 2, the execute unit 62-1 includes an integer processing unit 64-1 and a floating point processing unit 68; the execute unit 62-2 includes an integer processing unit 64-2 and a load/store processing unit 66-1; the execute unit 62-3 includes an integer processing unit 64-3 and a load/store unit 66-2; and the execute unit 62-4 includes only an integer unit 64-4.

As one skilled in the art will appreciate, scheduling of sub-instructions within a VLIW instruction word 52 and scheduling the order of VLIW instruction words within a program is important so as to avoid unnecessary latency problems, such as load, store and writeback dependencies. In accordance with the one embodiment of the present invention, the scheduling responsibilities are primarily relegated to the software compiler for the application programs. Thus, unnecessarily complex scheduling logic is removed from the processing core, so that the design implementation of the processing core is made as simple are possible. Advances in compiler technology thus result in improved performance without redesign of the hardware. In addition, some particular processing core implementations may prefer or require certain types of instructions to be executed only in specific pipeline slots or paths to reduce the overall complexity of a given device. For example, in accordance with the embodiment illustrated in FIG. 2, since only processing path 56-1, and in particular execute unit 62-1, include a floating point processing unit 68, all floating point sub-instructions are dispatched through path 56-1. As discussed above, the compiler is responsible for handling such issue restrictions in this embodiment.

In accordance with a one embodiment of the present invention, all of the sub-instructions 54 within a VLIW instruction word 52 issue in parallel. Should one of the sub-instructions 54 stall (i.e., not issue), for example due to an unavailable resource, the entire VLIW instruction word 52 stalls until the particular stalled sub-instruction 54 issues. By ensuring that all sub-instructions within a VLIW instruction word 52 issue simultaneously, the implementation logic is dramatically simplified.

3. Data Types

The registers within the processor chip are arranged in varying data types. By having a variety of data types, different data formats can be held in a general-purpose register. For example, there may be different data types associated with signed integer, unsigned integer, floating point, and fixed point values. Additionally, a register may be subdivided or partitioned to hold a number of values in separate fields. As can be appreciated, single instruction multiple data (SIMD) sub-instructions utilize registers that hold a number of operators.

Figure 3:
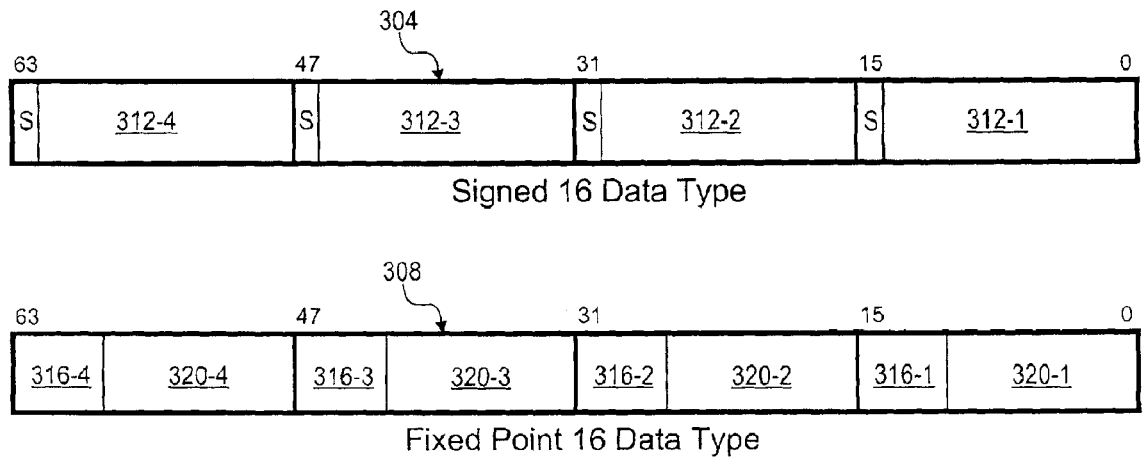
FIG. 3 is a diagram showing some data types generally available to the processor chip.

With reference to FIG. 3, some of the data types 304, 308 available for the multiply-accumulate sub-instructions are shown. In this embodiment, the registers are sixty-four bits wide. The registers are subdivided to hold multiple values, such as a signed 16 data type 304 and a fixed point 16 data type 308. Preferably, the IEEE standards for fixed point registers (i.e., ANSI/IEEE std 754-1985) are used for the fixed point data types. As those skilled in the art appreciate, there are other possible data types and this invention is not limited to those described above. For example, the registers could be larger than sixty-four bits and hold multiple operands having sizes of eight, sixteen, thirty-two, sixty-four, or one hundred and twenty-eight bits. Further the operands could be integers, fixed point, floating point, or two's complement values.

Although there are a number of different data types, a given sub-instruction 54 may only utilize a subset of these. For example, one embodiment of the multiply-accumulate sub-instruction may only utilize fixed point data types. However, other embodiments could use different data types.

4. Multiply-Accumulate Sub-Instruction

Figure 4:
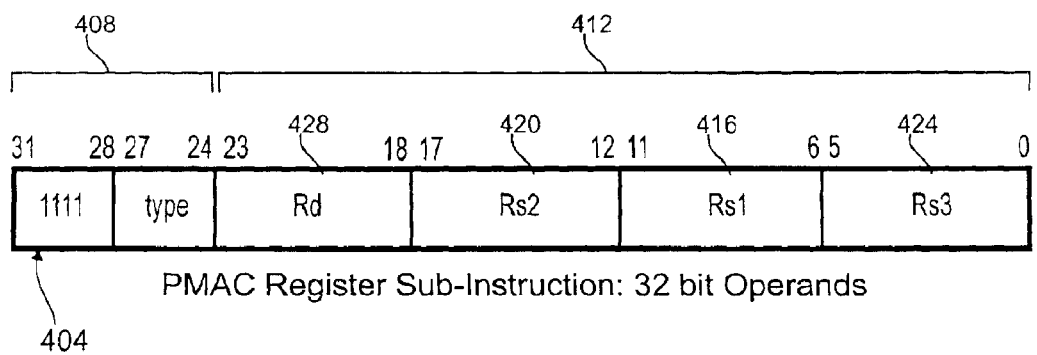
FIG. 4 is a diagram showing an embodiment of machine code syntax for the parallel multiply accumulate sub-instruction.

Referring next to FIG. 4, the machine code for a multiply-accumulate sub-instruction ("PMAC") 404 is shown. This sub-instruction 404 uses the register addressing form where Rs1 is a first input operand 416, Rs2 is a second input operand 420, Rs3 is a third input operand 424, and Rd is an output operand 428. The multiply-accumulate sub-instruction 404 is thirty-two bits wide such that a four-way VLIW processor with an one hundred and twenty-eight bit wide instruction word 52 can accommodate execution of four sub-instructions 404 at a time. The sub-instruction 404 is divided into an address and op code portions 412, 408. Generally, the address portion 412 contains the information needed to load and store the operators, while the op code portion 408 indicates the function to perform upon the operators.

The multiply-accumulate sub-instruction 404 uses the register addressing format to reference four general purpose registers. A first, second and third source addresses 416, 420, 424 are used to load a first, second and third source registers from the register file 60. A destination address 428 is used to indicate where to store the results into a general-purpose destination register. Since each register address 416, 420, 424, 428 has six bits in this embodiment, sixty-four registers are possible in an on-chip register file 60. In this embodiment, all loads and stores are performed with the on-chip register file 60. However, other embodiments could allow addressing registers outside the processing core 12.

Bits 31–24 of the sub-instruction 404 are the op codes 408 which are used by the processing core 12 to execute the sub-instruction 54. Decode logic 58 interprets the op codes 408 to configure the processing core 12 to implement the desired instruction. Various sub-instructions 54 may have different amounts of bits devoted to op codes 408.

The type field of the op code 408 located in bits 24–27 indicates which kind of multiply-accumulate sub-instruction to perform. The sole table lists several different type fields that correspond to different ways for performing a multiply-accumulate sub-instruction. In each type of the multiply-accumulate sub-instruction, the operands are sixteen bits wide although other embodiments could use operands of different sizes. The first input operands in the first input register Rs1 are respectively multiplied by the second input operands in the second input register Rs2 to form a product. The four products are respectively added to the third input operands Rs3 to form output operands that are stored in the output register Rd. Although the output operands are determined by the formula Rd=Rs1*Rs2+Rs3 or Rd=Rs1*Rs2−Rs3, the output operands can be determined in any number of ways. In the table, some types have integer, two's complement or fixed point operands; some use two sub-instructions to separately calculate the low and high-order bits of the results; and some truncate, round or saturate values during the process.

TABLE

| Assembly Syntax | Type Field | Description |
|---|---|---|
| pmac Rs1, Rs2, Rs3, Rd | 0000 | All operands are two's integer values. Only the low 16 bits of each output operand are written to Rd. |
| pmach Rs1, Rs2, Rs3, Rd | 0100 | All operands are two's integer values. Only the high 16 bits of each output operand are written to Rd. |
| pmacs Rs1, Rs2, Rs3, Rd | 0001 | All operands are two's complement values. If overflow occurs, the result is saturated at (1^15) or (1^15−1). |
| pmacf Rs1, Rs2, Rs3, Rd | 0010 | Operands are fixed-point two's compliment with 4 bits before the binary point and 12 bits after. Each of the first and second input operands are multiplied together, the resulting products are shifted right 12 bits to truncate them back to the fixed-point configuration. These products are then added to their corresponding third input operands, and the results placed into output register. |

TABLE-continued

| Assembly Syntax | Type Field | Description |
|---|---|---|
| pmacrf Rs1, Rs2, Rs3, Rd | 0110 | Operands are fixed-point two's compliment with 4 bits before the binary point and 12 bits after. Each of the corresponding input operands are multiplied together, the products are shifted right 12 bits and rounded back to the fixed-point configuration. These values are then added to their correspondents from register Rs3, and the results placed into Rd. |
| pmacfs Rs1, Rs2, Rs3, Rd | 0011 | Operands are fixed-point two's compliment with 4 bits before the binary point and 12 bits after. If overflow occurs, the result is saturated at $(1\char`\^15)$ or $(1\char`\^15-1)$. |
| pmacrfs Rs1, Rs2, Rs3, Rd | 0111 | Operands are fixed-point two's compliment with 4 bits before the binary point and 12 bits after. Each of the corresponding input operands are multiplied together, the products are shifted right 12 bits and rounded back to the fixed-point configuration. These values are then added to their correspondents from register Rs3, and the results placed into Rd. If overflow occurs, the result is saturated at $(1\char`\^15)$ or $(1\char`\^15-1)$. |
| pmsb Rs1, Rs2, Rs3, Rd | 1000 | All operands are two's complement values. The third input operand is subtracted from the product before the low 16 bits of the result are placed into Rd. |
| pmsb Rs1, Rs2, Rs3, Rd | 1001 | All operands are two's complement values. The third input operand is subtracted from the product before the high 16 bits of the result are placed into Rd. |
| pmach Rs1, Rs2, Rs3, Rd | 1011 | All operands are two's complement values. The third input operand is subtracted from the product before the high 16 bits of the result are placed into Rd. If overflow occurs, the result is saturated at $(1\char`\^15)$ or $(1\char`\^15-1)$. |
| pmach Rs1, Rs2, Rs3, Rd | 1010 | Operands are fixed-point two's compliment with 1 sign bit, 3 bits before the binary point and 12 bits after. Each of the first and second input operands are multiplied together, the resulting products are shifted right 12 bits to truncate them back to the fixed-point configuration. The third input operands are then subtracted from their corresponding products, and the results placed into the output register. |
| pmsbrf Rs1, Rs2, Rs3, Rd | 1110 | Operands are fixed-point two's compliment with 1 sign bit, 3 bits before the binary point and 12 bits after. Each of the first and second input operands are multiplied together, the resulting products are shifted right 12 bits and rounded back to the fixed-point configuration. The third input operands are then subtracted from their corresponding products, and the results placed into the output register. |
| pmsbfs Rs1, Rs2, Rs3, Rd | 1011 | Operands are fixed-point two's compliment with 1 sign bit, 3 bits before the binary point and 12 bits after. Each of the first and second input operands are multiplied together, the resulting products are shifted right 12 bits to truncate them back to the fixed-point configuration. The third input operands are then subtracted from their corresponding products, and the results placed into the output register. If overflow occurs, the result is saturated at $(1\char`\^15)$ or $(1\char`\^15-1)$. |
| pmsbrfs Rs1, Rs2, Rs3, Rd | 1111 | Operands are fixed-point two's compliment with 1 sign bit, 3 bits before the binary point and 12 bits after. Each of the first and second input operands are multiplied together, the resulting products are shifted right 12 bits and rounded back to the fixed-point configuration. The third input operands are then subtracted from their corresponding products, and the results placed into the output register. If overflow occurs, the result is saturated at $(1\char`\^15)$ or $(1\char`\^15-1)$. |

Typically, a compiler is used to convert assembly language or high level languages into machine code that contains the op codes. As is understood by those skilled in the art, the op codes control multiplexors, other combinatorial logic and registers to perform a predetermined function. Furthermore, those skilled in the art appreciate there could be many different ways to implement op codes.

5. Multiply-Accumulate Implementation

Figure 5:
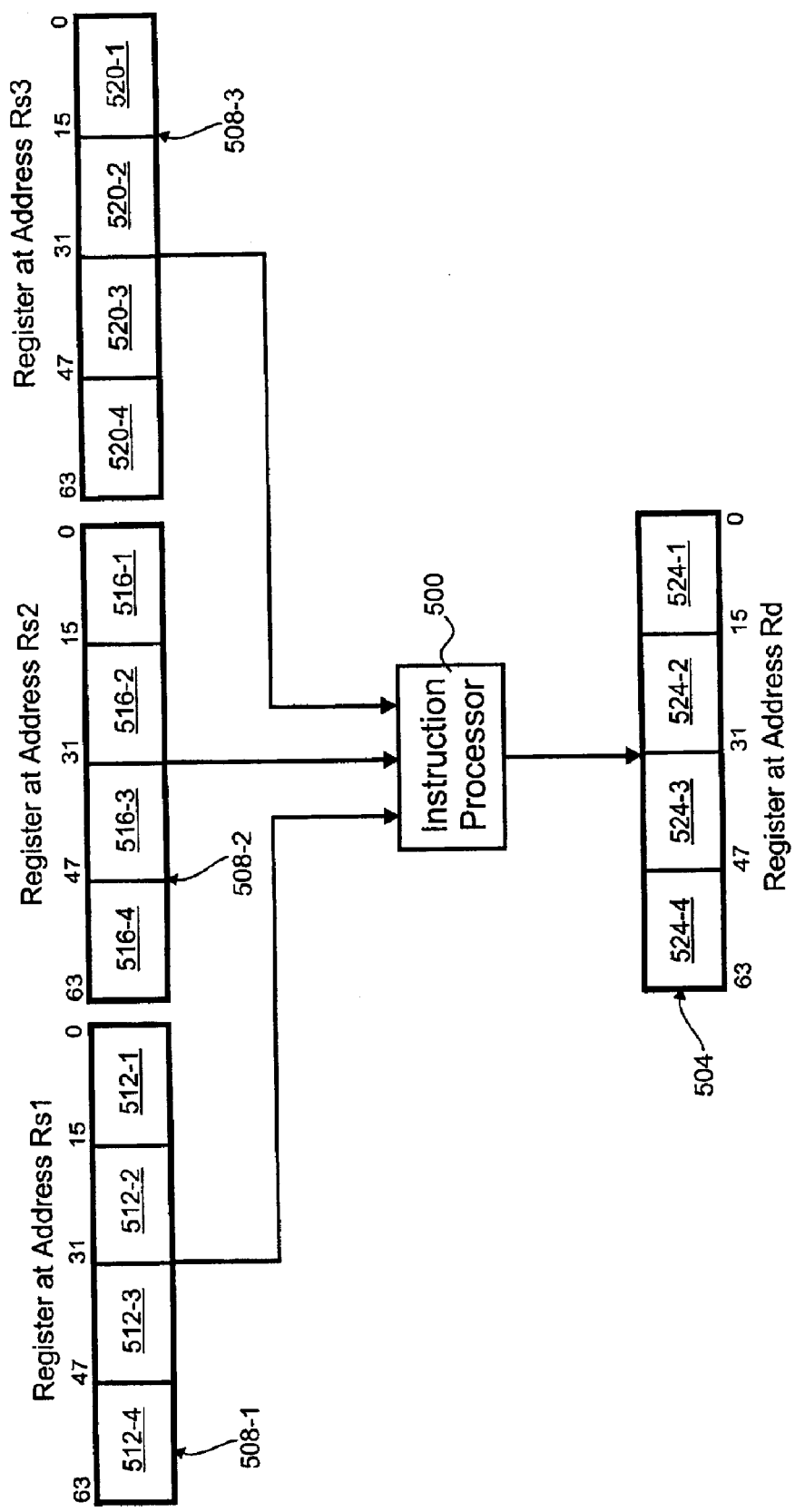
FIG. 5 is a block diagram that schematically illustrates an embodiment of the multiply-accumulate instruction processor.

The multiply-accumulate sub-instruction allows calculating a multiply followed by a sum on a group of numbers more quickly by using parallelism. An embodiment of the parallel multiply-accumulate function is shown in the block diagram of FIG. 5. There are three input registers 508 and one output register 504 in this embodiment. An instruction processor 500 coupled to the registers 504, 508, loads the input operands from the input registers 508, performs the multiply-accumulate function and stores the results in the output register 504. As those skilled in the art appreciate, the multiply-accumulate function typically takes more than one clock cycle to complete, however, pipelining can be used to reduce the effective latency.

In this embodiment, each input and output register 504, 508 is sub-divided to hold a number of operands. The registers 504, 508 are sixty-four bits wide and hold four operands 512, 516, 520, 524 each. All the operands 512, 516, 520, 524 are sixteen bits in length. However, other embodiments could use different size registers and operands.

Figure 6:
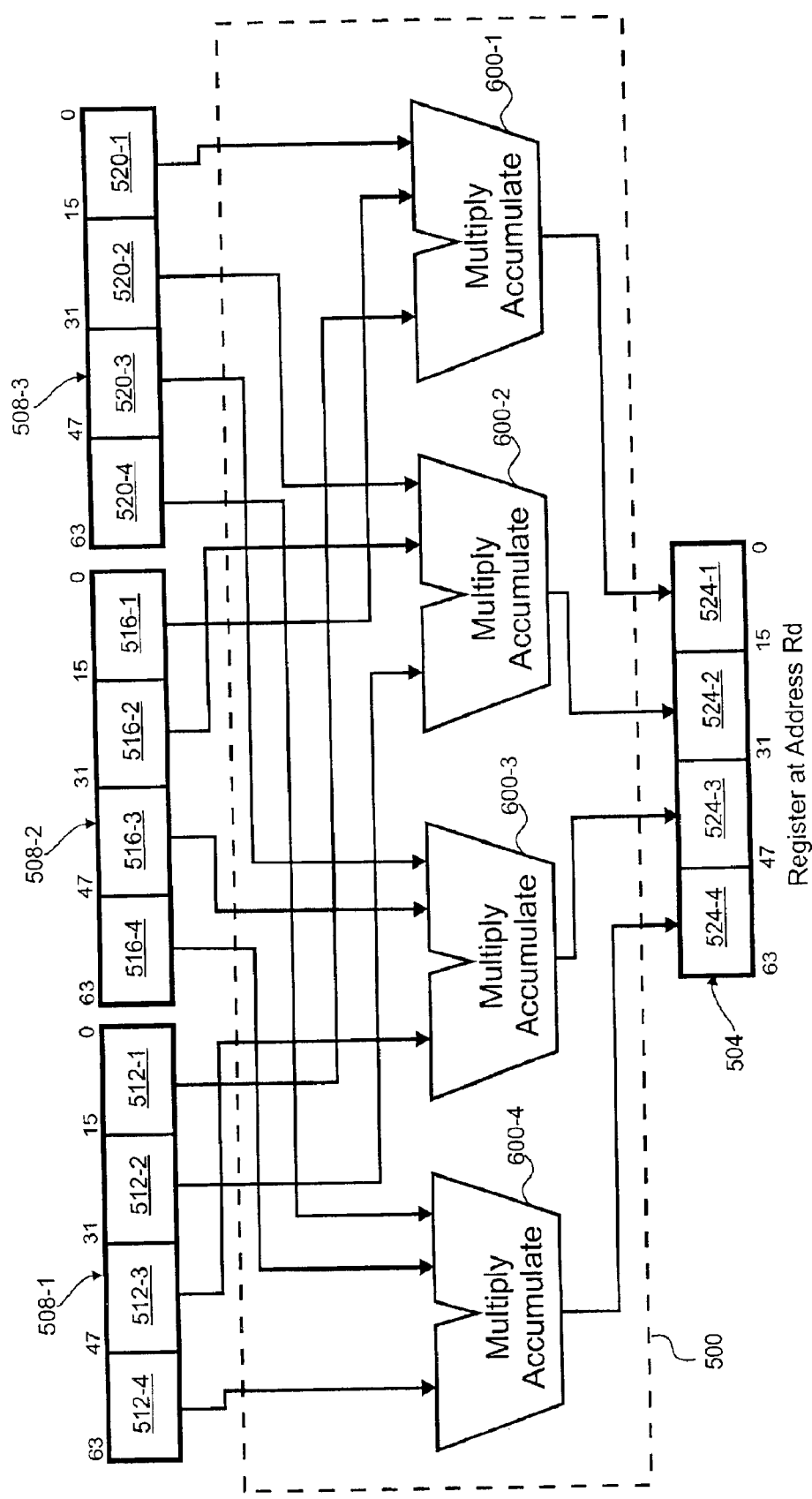
FIG. 6 is a block diagram that schematically shows one embodiment having four parallel multiply-accumulate functions.

Referring next to FIG. 6, a block diagram is shown of an embodiment that depicts data flow into a number of multiply-accumulate functions 600 that comprise the instruction processor 500. A given instruction processor 500 has four multiply-accumulate functions 600, however, other embodiments could have a different number of multiply-accumulate functions 600. The input operands 512, 516, 520 are read from the input registers 508 and coupled to their respective multiply-accumulate function 600. The result from each multiply-accumulate function 600 is written to the output register 504. For example, the first multiply-accumulate function 600-1 loads a multiplicand operator 512-1 from the first input register 508-1, loads a multiplier operator 516-1 from the second input register 508-2 and an accumulate value operator 520-1 from the third input register 508-3. After processing, the result 524-1 is written to the output register 504. The input operators 512-1, 516-1, 520-1 and output operator 524-1 for this example occupy the first sixteen bits of their respective registers 508, 504.

Figure 7:
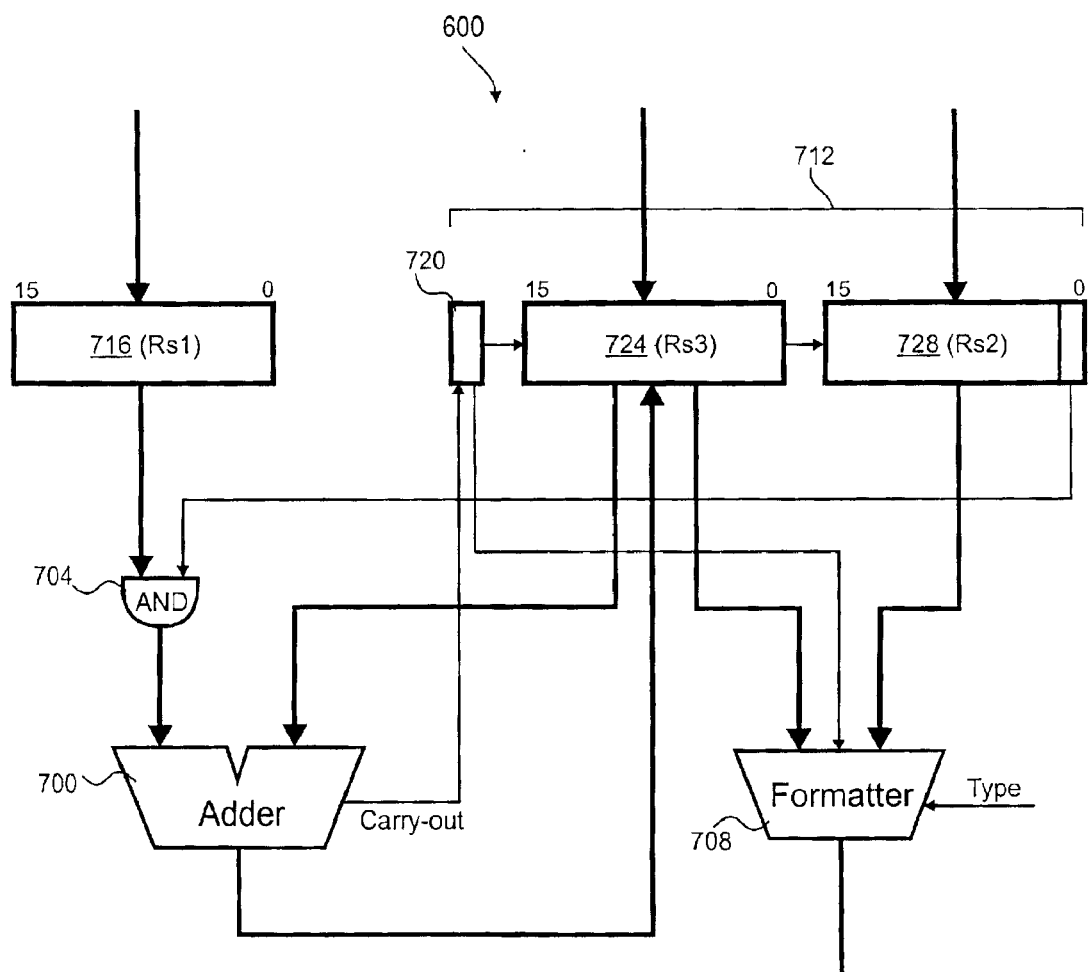
FIG. 7 is a block diagram that schematically depicts an embodiment of the multiply-accumulate function.

With reference to FIG. 7, an embodiment of a multiply-accumulate function 600 is shown in block diagram form. This embodiment uses an iterative method to perform the multiply-accumulate operation as a series of additions and shifts. Included in the multiply-accumulate function 600 are an adder, an AND gate 704, a formatter 708, a multiplicand register 716, a high-order bit register 720, an accumulate register 724, and a multiplier register 728. The high-order bit register 720, accumulate value register 724 and multiplier register 728 comprise a result field 712 that is used to determine the output operand 524.

The accumulate-multiply function 600 receives input from three input registers 508. The first input operand 512 is loaded from the first input register 508-1 and into the multiplicand register 716. Similarly, the second input operand 516 is loaded from the second input register 508-2 and into the multiplier register 728, and the third input operand 520 is loaded from the third input register 508-3 and into the accumulate register 724. As those skilled in the art will appreciate, placing the third operand 520 in the accumulate register 724 has the effect of adding the third operand to the product of the first and second operands 512, 516.

To perform the multiply, a series of additions and shifts are performed. The first time through the loop, the multiplicand register 716 is added to the accumulate register 724 so long as the least significant bit (LSB) of the multiplier register 728 is equal to one. The sum from the adder 700 is stored in the accumulate register 724, and the carry-out bit is stored in the high-order bit register 720. If the LSB of the multiplier register 728 is equal to zero, nothing is added to the accumulate register 724 and it remains unchanged. Once the output from the adder 700 is written, the result field 712 is shifted right such that the high-order bit register 720 becomes the most significant bit (MSB) of the accumulate register 724, and the LSB of the accumulate register 724 becomes the MSB of the multiplier register 728. Another thirty-one adds and shifts are performed until the result field 712 accurately reflects the multiply-accumulate of the input operands 512, 516, 520.

As can be appreciated, the result field 712 can occupy thirty-three bits when the input operands 512, 516, 520 are sixteen bits wide. Since the output operand 524 portion of the output register 504 is only sixteen bits wide, the result field 712 is shortened by the formatter 708 according to the type field of the op code 408. The formatter 708 may pick the high-order bits, the low order bits, truncate all the bits, round the bits, or saturate the bits as described in the above Table. For example, if the type field is equal to 0011b, the low order sixteen bits would be selected. In the event the result could not fit into the allocated sixteen bits, the output operand 524 would be set at a saturated value. The saturated value corresponds to either the highest or lowest possible value given the format and width of the output operand 524.

Figure 8:
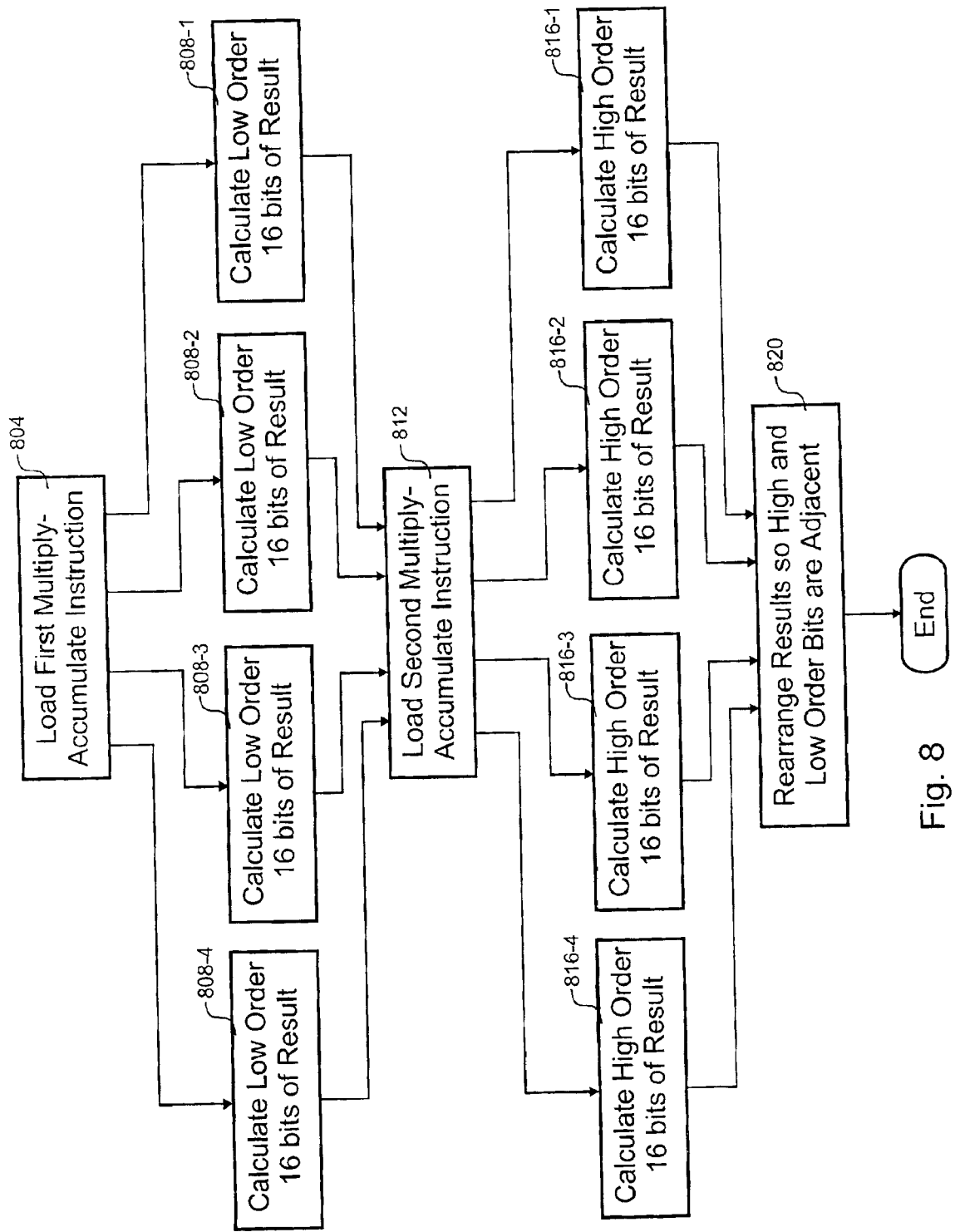
FIG. 8 is a flow diagram that depicts an embodiment of a process for calculating a thirty-two bit multiply-accumulate.

Referring next to FIG. 8, a flow diagram that depicts an embodiment of a process for calculating a SIMD, thirty-two bit, multiply-accumulate is shown. In this embodiment, four separate calculations are preformed in parallel to increase the IPC. The process begins in step 804 where the multiply-accumulate sub-instruction is loaded 404. After decoding the sub-instruction, the three input registers 508 are loaded from the register file 60. The first input register 508-1 includes four multiplicand values 512, the second input register 508-2 includes four multiplier values 516 and the third input register 508-3 includes four accumulate values 520. Each of the multiplicand, multiplier and accumulate values 512, 516, 520 are loaded into their respective multiply-accumulate function blocks 600.

In four parallel steps 808, the low-order bits of the result are calculated. To accomplish this, the formatter 708 in each multiply-accumulate function 600 is given a type of 0000b. All of the results are stored in the output register 504. Only the low order 16 bits of the each result fits into the fields 524 of the output register 504.

To obtain the high-order bits of the multiply-accumulate function, a second sub-instruction 404 is issued. This sub-instruction 404 indicates which operands to load from the register file 60. The same input registers 508 are loaded as were loaded in step 804 above. In four parallel steps 816, the high-order bits of the result are calculated. To accomplish this multiply-accumulate, the formatter 708 is given a type of 0100b. Once all the results are calculated, they are stored in their respective fields 524 of the output register 504.

At this point, the high- and low-order bits for each calculation are in different registers of the register file 60. In step 820, a swap operation is used to arrange the results from the two sub-instruction issues in adjacent fields of registers. After completion of the swap operation, there are four thirty-two bit results from the two multiply-accumulate operations. Although this embodiment uses two separate sub-instructions to perform this calculation, other embodiments could use a single sub-instruction that outputs the thirty-two bit results into two separate registers. For example, only one output register could be specified and it would be presumed that two contiguous registers starting at the specified register would hold the result without the need for rearranging the four output operands.

Figure 9:
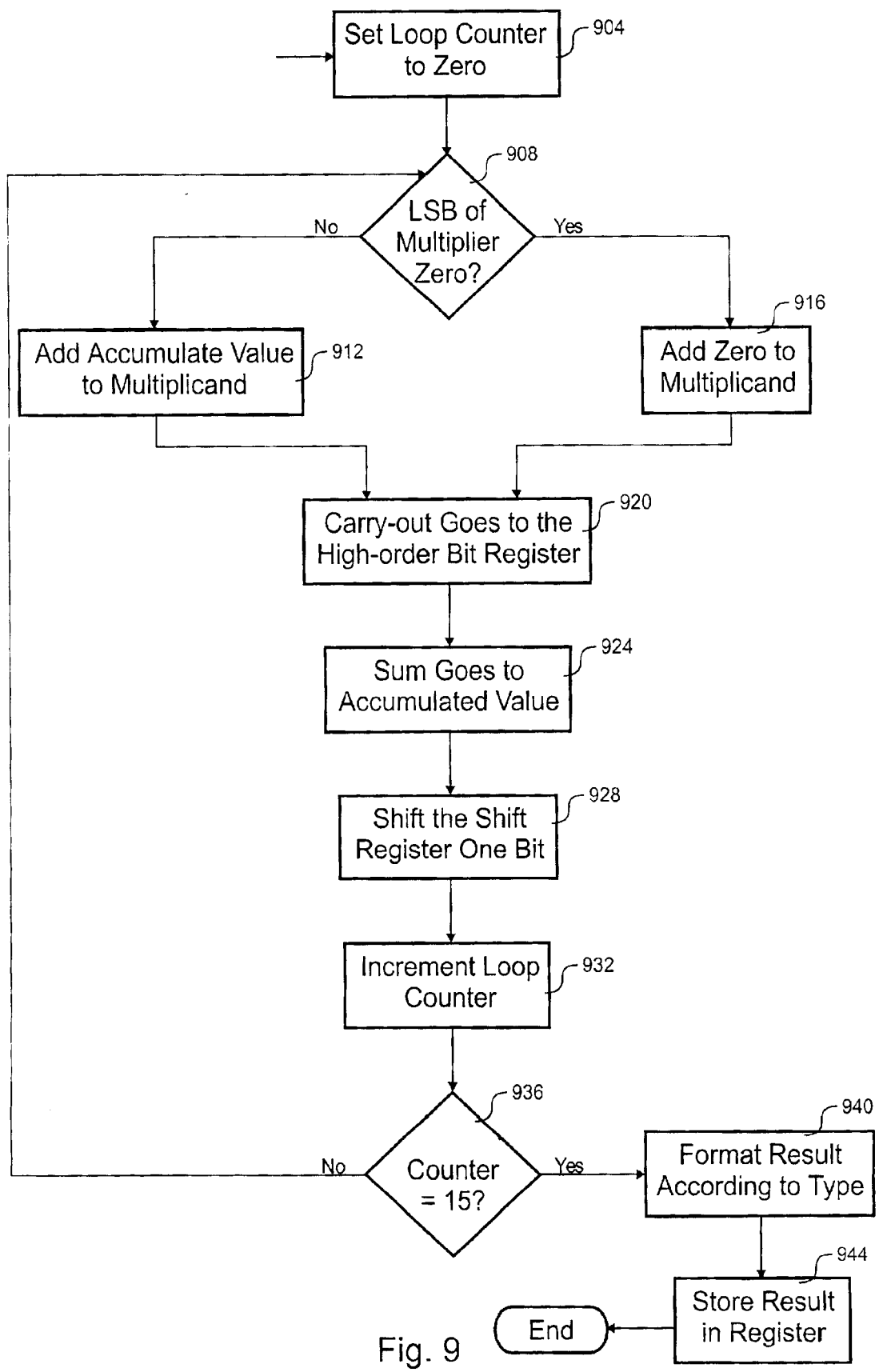
FIG. 9 is a flow diagram that shows an embodiment of a process for performing a multiply-accumulate operation.

With reference to FIG. 9, a flow diagram of an embodiment of a process for performing a multiply-accumulate operation is shown. This process uses an iterative method for performing the multiply-accumulate with a series of adds, shifts and other operations. Performance of the process occurs in one of the multiply-accumulate functions 600. The process begins in step 904 where a loop counter is set to zero. Iterations are counted by the loop counter.

The loop process begins in step 908 where a determination is made as to whether the least significant bit (LSB) of the multiplier 728 is zero or not. If the LSB is not zero processing continues to step 912 where the accumulate value 724 is added to the multiplicand 716, otherwise, a zero is added to the multiplicand 716 in step 916.

After either step 912 or 916 is performed, processing continues to step 920 where the carry-out from the addition is loaded into the high-order bit register 720. The resulting sum goes to the accumulated value register 724 in step 924. The result field 712 is shifted right one bit in step 928. The high-order bit register 720, accumulated value register 724 and multiplier register 728 are connected as one shift register.

The loop counter is incremented once in step 932. Although this embodiment uses a counter that counts up, a counter that counts down could similarly be used instead. In step 936, a determination is made as to whether the count has reached the terminal count of thirty-two. Processing continues through the loop at least once more if the count has not reached thirty-two yet. If the count is thirty-two, the whole result is calculated. In step 940, the result is formatted as specified by the type field. After formatting, the result is stored in the output register 504 in step 944. In this way, the multiply-accumulate calculation is performed in a loop.

CONCLUSION

In conclusion, the present invention provides a novel computer processor chip having a sub-instruction for performing parallel multiply-accumulate functions that allows performing several multiply-accumulate functions in a single issue. While a detailed description of presently preferred embodiments of the invention is given above, various alternatives, modifications, and equivalents will be apparent to those skilled in the art. For example, while the above embodiments may use a loop to calculate the multiply-accumulate, other methods for performing this function could be used such as a cascaded adder structure. Additionally, some embodiments could present the whole thirty-three result field as an output to avoid overflow problems. Therefore, the above description should not be taken as limiting the scope of the invention that is defined by the appended claims.

What is claimed is:

1. A processing core that executes a parallel multiply accumulate operation, the processing core comprising:
   a first input operand register comprising a plurality of first input operands;
   a second input operand register comprising a plurality of second input operands;
   a third input operand register comprising a plurality of third input operands;
   a plurality of functional blocks that each perform a multiply accumulate operation, wherein an instruction for the multiply accumulate operation indicates a rounding algorithm to use, and the rounding algorithm is one of a plurality that can be indicated by various multiply accumulate instructions;
   an output operand register comprising a plurality of output operands, wherein each of the plurality of output operands is related to one of the plurality of first input operands, one of the plurality of second input operands and one of the plurality of third input operands.

2. The processing core as set forth in claim 1, wherein:
   each of the plurality of functional blocks produce a result equal to multiplying the first input operand with the second input operand to produce a product and adding or subtracting the third input operand to that product, and
   the instruction specifies whether an addition or a subtraction is performed.

3. The processing core as set forth in claim 2, wherein the product is truncated before adding the product to the third input operand.

4. The processing core as set forth in claim 2, wherein the product is rounded before adding the product to the third input operand.

5. The processing core as set forth in claim 1, wherein a very long instruction word includes a plurality of parallel multiply accumulate operations.

6. The processing core as set forth in claim 1, wherein the first through third input operands are at least one of following formats: integer, floating-point, fixed-point, and two's complement.

7. The processing core as set forth in claim 1, wherein the first through third input operands are at least one of: 128 bit values, 64 bit values, 32 bit values, 16 bit values, and 8 bit values.

8. The processing core as set forth in claim 1, wherein:
   the plurality of first input operands each has a first bit length equal to a second bit length of each of the plurality of output operands, and
   the instruction specifies if the plurality of output operands will be the high order bits of the result or the low order bits of the result.

9. A method for determining a plurality of output operands, the method comprising:
   loading a multiply accumulate instruction;
   decoding the multiply accumulate instruction wherein the multiply accumulate instruction specifies one of a plurality of rounding algorithms;
   loading a plurality of multiplicands, a plurality of multipliers and a plurality of accumulate values;
   processing a first multiplicand, a first multiplier and a first accumulated value in order to produce a first output operand;
   processing a second multiplicand, a second multiplier and a second accumulated value in order to produce a second output operand; and
   storing the first output operand and second output operand.

10. The method of claim 9, further comprising:
    loading a second multiply accumulate instruction;
    decoding the second multiply accumulate instruction;
    loading a second plurality of multiplicands, a second plurality of multipliers and a second plurality of accumulate values;
    processing a third multiplicand, a third multiplier and a third accumulated value in order to produce a third output operand;
    processing a fourth multiplicand, a fourth multiplier and a fourth accumulated value in order to produce a fourth output operand;
    storing the third output operand and fourth output operand; and
    concatenating the two of the first through fourth output operands together to form a larger output operand.

11. The method of claim 9, wherein the multiply accumulate instruction and the second multiply accumulate instruction are included in the same very long instruction word (VLIW).

12. The method of claim 9, wherein the predetermined value is equal to a largest or smallest value for the first and second output operand.

13. The method of claim 9, wherein a first rounding algorithm can be specified by the multiply accumulate instruction that causes truncation of an intermediate product, and a second rounding algorithm can be specified by the multiply accumulate instruction causes rounding of the intermediate product.

14. The method of claim 9, further comprising steps of:
    determining if the first output operand is larger than predetermined value; and
    replacing the first output operand with a predetermined constant.

15. A method for determining a plurality of output operands, the method comprising:
    loading a multiply accumulate instruction;
    decoding the multiply accumulate instruction;
    loading a plurality of multiplicands, a plurality of multipliers and a plurality of accumulate values;

determining a first result equal to a product of a first multiplicand and a first multiplier plus a first accumulate value;

storing the first result;

loading a second multiply accumulate instruction;

decoding the second multiply accumulate instruction;

loading a second plurality of multiplicands, a second plurality of multipliers and a second plurality of accumulate values;

determining a second result equal to a product of a second multiplicand and a second multiplier plus a second accumulate value;

storing the second result; and arranging the first result and second result into an unified result occupying more bits than either the first or second results.

16. The method of claim 15, wherein the multiply accumulate instruction and the second multiply accumulate instruction are included in the same very long instruction word (VLIW).

17. The method of claim 15, further comprising:

determining a second result equal to a product of a second multiplicand and a second multiplier plus or minus a second accumulate value; and storing the second result.

18. The method of claim 15, further comprising:

determining if the first result is larger than a predetermined value; and replacing the first result with a predetermined constant.

19. The method of claim 18, wherein the predetermined value is equal to a largest or smallest value for the first and second output operand.

20. The method of claim 15, wherein the multiply accumulate instruction specifies one of a plurality of rounding algorithms.

* * * * *